(12) United States Patent
Narayanan

(10) Patent No.: US 8,244,780 B1
(45) Date of Patent: Aug. 14, 2012

(54) PARAMETER ORIENTED AUTOMATED DATABASE COMMAND

(75) Inventor: Krishna K. Narayanan, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 13/086,184

(22) Filed: Apr. 13, 2011

(51) Int. Cl.
*G06F 7/00* (2006.01)
(52) U.S. Cl. ........................................ 707/804; 707/812
(58) Field of Classification Search .................. 707/804, 707/812
See application file for complete search history.

(56) References Cited

U.S. PATENT DOCUMENTS

| | | | |
|---|---|---|---|
| 2009/0106210 A1* | 4/2009 | Slezak et al. | 707/3 |
| 2011/0191285 A1* | 8/2011 | Sawai | 707/602 |
| 2011/0196880 A1* | 8/2011 | Soules et al. | 707/752 |

* cited by examiner

*Primary Examiner* — Miranda Le

(57) ABSTRACT

A method for performing a data store operation is provided. The method comprises invoking a command to execute on a processor in a computer that identifies an input file, determining a structure of a data table stored in a database and reading rows of data out of the data table based on the input file. For each row comparing data read out of the data table to a corresponding row of data in the input file. When the row of data read is identical to the corresponding row of data in the input file, not updating the row of data in the data table. When the row of data read is not identical to the corresponding row of data in the input file, updating the row of data stored in the corresponding row of data in the input file based on the structure of the data table.

15 Claims, 5 Drawing Sheets

PARAMETER ORIENTED AUTOMATED DATABASE COMMAND

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A database is a system intended to organize, store, and retrieve large amounts of data easily. A database management system (DBMS) is a set of programs that controls the creation, maintenance, and the use of a database, allowing users and other software to store and retrieve data in a structured way.

SUMMARY

In an embodiment, a processor-implemented method of performing a data store operation is disclosed. The method comprises invoking from a command line interface a command to execute on a processor in a computer in a first invocation, wherein the command identifies a first input file and in response to the first invocation of the command, automatically determining by the computer a first structure of a first data table stored in a first database. The method further comprises, in response to the first invocation of the command, automatically reading by the computer a first plurality of rows of data out of the first data table, wherein the first plurality of rows are identified based on the first input file. The method further comprises, in response to the first invocation of the command, for each row of the first plurality of rows automatically comparing by the computer the row of data read out of the first data table to a corresponding row of data in the first input file and, when the row of data read out of the first data table is identical to the corresponding row of data in the first input file, not updating the row of data in the first data table. When the row of data read out of the first data table is not identical to the corresponding row of data in the first input file, the method further comprises automatically updating by the computer the row of data in the first data table with the data stored in the corresponding row of data in the first input file based on the first structure of the first data table.

In an embodiment, a processor-implemented method for performing a data store operation is disclosed. The method comprises invoking a command with an invocation expression, where the invocation expression identifies an input file. In response to the invocation of the command, automatically determine a first structure of a data table stored in a database. In response to the invocation of the command, automatically read a plurality of rows of data out of the data table, where the plurality of rows are identified based on the input file. In response to the invocation of the command, execute a tiered data manipulation on some rows of the plurality of rows based on the value of the rows in the data table and based on the value of corresponding rows in the input file.

In an embodiment, a processor-implemented method for performing a data store operation is disclosed. The method comprises invoking a command with an invocation expression, where the invocation expression identifies an input file. In response to the first invocation of the command, automatically determine a first structure of a data table stored in a database. In response to the first invocation of the command, automatically read a plurality of rows of the input file. In response to the first invocation of the command, automatically read a first plurality of rows of data out of the data table, where the plurality of rows are identified based on the input file. In response to the invocation of the command, execute a tiered data manipulation on some rows of the plurality of rows based on the value of the rows in the data table and based on the value of corresponding rows in the input file. Change the input file. Invoke a command a second time with the invocation expression, where the invocation expression identifies the input file. In response to the second invocation of the command, automatically determine a structure of the data table stored in the database. In response to the second invocation of the command, automatically read a plurality of rows of the input file. In response to the second invocation of the command, automatically read a second plurality of rows of data out of the data table, where the second plurality of rows are identified based on the input file and are different from the first plurality of rows. In response to the second invocation of the command, execute a tiered data manipulation on some rows of the second plurality of rows based on the value of the rows in the data table and based on the value of corresponding rows in the input file.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
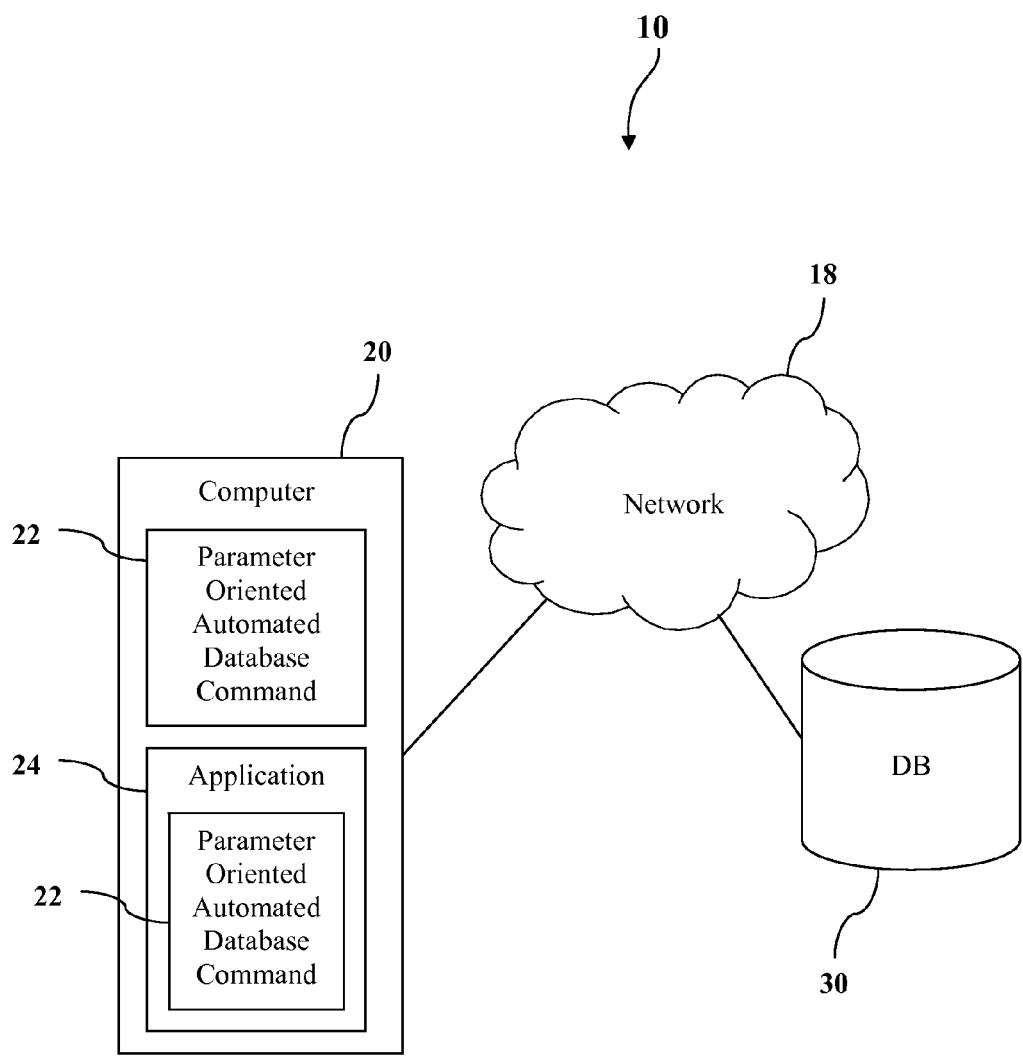
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

An automated parameter oriented database command for performing one or more data manipulation language commands from a command line is described. Data manipulation languages are a family of computer languages used by computer programs and database users to read, insert, delete, and update data in a database. Data manipulation language comprises the data change statements used to modify data but not the data table structure or database objects. Data manipulation languages were initially used only by computer programs, but have come to be used by users as well. To access a database and execute data manipulation language commands typically requires the user to execute a program and execute data manipulation language commands from within the program, but the current disclosure allows for executing commands directly from the command line.

From the operating system command line, the user may invoke a command and provide optional parameters that control the interaction with the data store via the command. Optional parameters include specifying a data table name of the data to access, providing a direct data manipulation language statement to be executed by the command, and providing the name of a data manipulation language script to be executed by the command. Upon invocation of the command, the parameters are processed and converted into data manipulation language commands to be executed on the data store. A single command may result in multiple data manipulation language commands being executed to return the desired result, providing the user with a means to efficiently interact with the data store. Prior to executing data manipulation language commands on the data store, the command will determine the structure of the tables in the data store. Because the command determines the structure of the tables in the data store each time it executes, the command is able to function properly even as changes are made to the table structure.

The user may also specify input and output files as part of the optional parameters. Input files may provide data for updating the data store as well as mapping information defining which rows of the data store are to be updated. Output files can be used to save the output in place of sending it to standard output, which displays it directly to the user but does not store the results. The command may also be used in conjunction with other commands and operations. For example, instead of providing an output file name as one of the command parameters, the user may choose to follow the command with an operator to redirect standard output and provide the output file name as part of the command.

Additionally, the command may be utilized in distributing work across multiple processors. The multiple processors may be spread across multiple computers, each executing an instance of the command that specifies a different input file. The different input files may each identify different rows of the same data table in the data store, and the execution of the different command instance by a given process may execute without interfering with the command instances executed on the other processors. By running in parallel on multiple processors, the workload is distributed and can be completed more quickly.

Turning now to FIG. 1, a system 10 is described. The system comprises a network 18, a computer 20, and a data store 30. The computer 20 comprises a parameter oriented automated database command 22 and an application 24. The parameter oriented automated database command 22 may be a compiled binary executable command that is executed from the command line. In an embodiment, the parameter oriented automated database command 22 may be implemented in a scripting language which is indirectly executed at runtime by an interpreter program in place of being compiled and executed by the processor directly. The parameter oriented automated database command 22 is used by a user to interact over the network 18 with the data store 30 to read, insert, delete, and update data contained in the data store 30. The user may specify specific data manipulation requests through the use of parameters given at the invocation of the parameter oriented automated database command 22. The parameter oriented automated database command 22 works by analyzing the supplied parameters and converting them into data manipulation language commands that act on the data store 30. Examples of data manipulation language commands are SELECT, INSERT, UPDATE, and DELETE. If a data table name is specified in the parameters, the parameter oriented automated database command 22 will operate on data and rows in that table, using keys provided from a key parameter if provided in the command invocation string. The parameter oriented automated database command 22 may also be provided a script file name for a file containing a data manipulation language script.

The application 24 may be an application residing on the computer 20 that requires access to the data store 30. The functionality of the parameter oriented automated database command 22 may be incorporated into the application 24 to enable the application to programmatically access the data store 30 in substantially the same manner that a user would from the command line. The parameter oriented automated database command 22 code may be linked into the application 24 as a library file or subroutine allowing the application 24 to access the functions of the parameter oriented automated database command 22.

The parameter oriented database command 22 is described in broad terms in this specification. In an embodiment the parameter oriented automated database command 22 may be called an iselect command, and the data manipulation language commands may use the formal Structured Query Language (SQL). The table below lists the optional parameters supported by the parameter oriented database command 22 and a brief description of their use.

| Parameter Usage | Description |
| --- | --- |
| -s <sql_select_script.sql> | The select statement from the given sql script will be used as the select statement in the process. |
| -S <SQL_SELECT_STATEMENT> | The given SQL select statement will be used as the select statement in the process. |
| -T <Table_Name> | SELECT * FROM <Table_Name>, will be used as the select statement in the process. |
| -c "input_col_1, ...input_col_n" | Used to change the Bind & Input column mapping. |
| -d <Delta/Input_File_Name> | The values for bind variables in select statement are taken from either from Input File or from stdin. |
| -e | add '/' or the <Esc Character> from -E option, to the output if the data value contains the output field separator. |
| -i <input_field_separator_char> | Used to change the input field separator. |
| -j | Similar to an outer join in oracle. |
| -k "key_col_1, ...key_col_n" | Used to give the Key-Info & Input column mapping. |
| -n | Used when using -s option and if there are no bind variables. |
| -o <out_field_separator_char> | Used to change the output field separator. |
| -r | -r option causes the process NOT to check and replace with a space if the output data value contains the output field separator. |

-continued

| Parameter Usage | Description |
| --- | --- |
| -u | If for a single input record multiple table records are fetched, this option will pick the very first record & helps avoids processing all records. |
| -v | This v (verbose) option causes iselect to type additional messages. |
| -a | Causes the process to include Input records with output. |
| -A | Causes the process to include Input records with output. |
| -C <Commit#> | Causes the process to commit when Commit# number of DMLs performed. |
| -D | Describes the select-list & exits. |
| -E <new_esc_char> | Provides the process with a new <Esc Character>. |
| -F "\|<colx>, S<col-m>, RI<col-y>:S<col-n>[:<default>], ..." | Used to provide custom output. |
| -H | Used to include selected column names as heading. |
| -I <new_ivariable_len#> | Used to change the length of Oracle Indicator variable. |
| -L <new_total_select_list#> | Used to change the number of select list item. |
| -M <new_column_len#> | Used to change the length of Oracle column Name. |
| -N <new_nls_date_format> | Used to change NLS_DATE_FORMAT. |
| -O <out_put_file_name> | The argument given is the name of an output file to use instead of the standard output. |
| -P | Used to include non-printable characters in the output. |
| -R | Used along with -U to use ROWID in DELETE or UPDATE. |
| -U [SXDIU] | Converts -T <table_name> into DMLs for <table_name>. |
| -W <where_condition> | Used to input a WHERE condition. |

Figure 2:
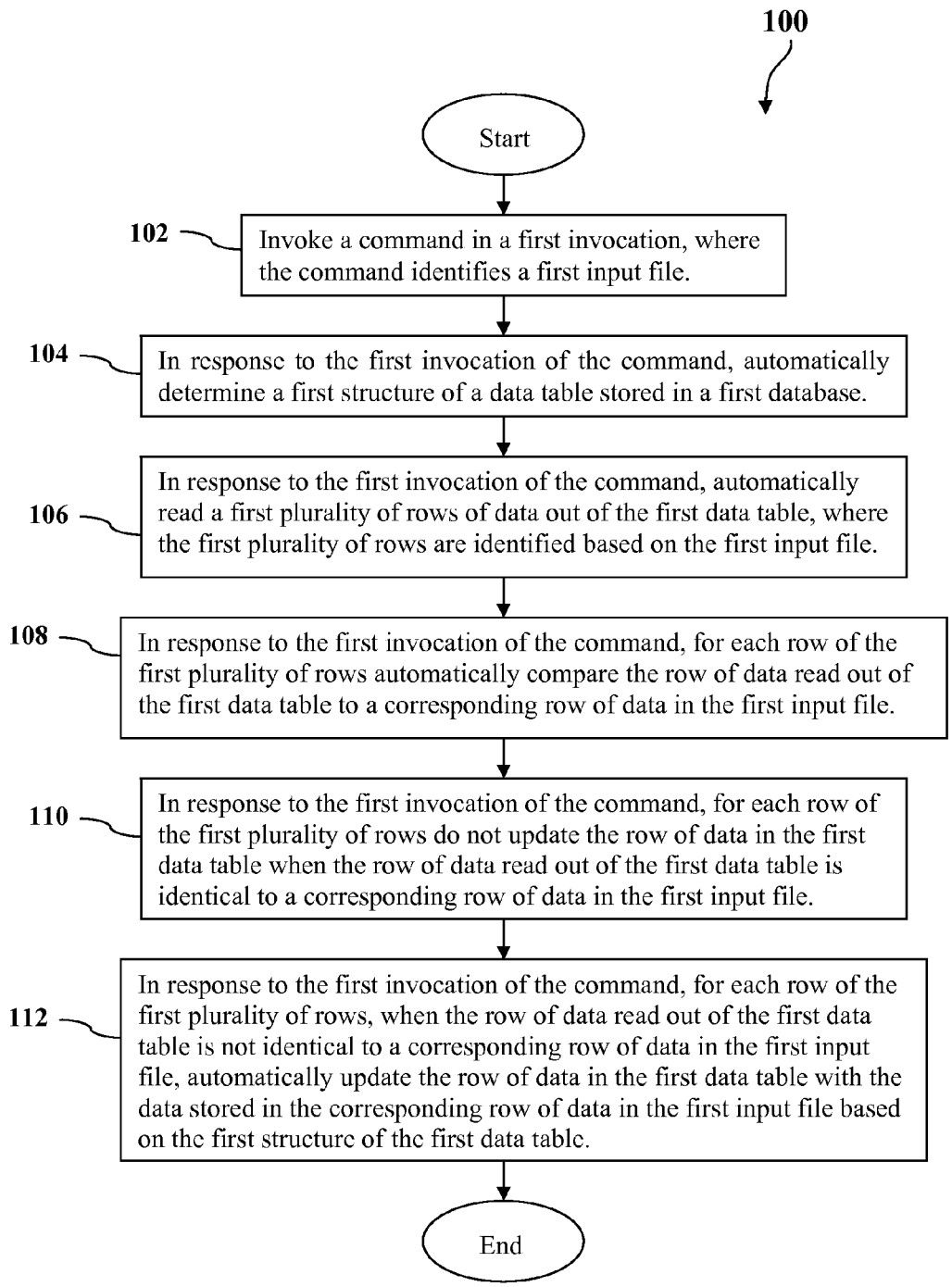
FIG. 2 is a flow chart of a method according to an embodiment of the disclosure.

Turning now to FIG. 2, a processor-implemented method 100 for performing data manipulation language commands from a command line is disclosed. At block 102, a command is invoked in a first invocation, where the command identifies a first input file. The input file may contain data to be input into a data store. Alternatively, the command may comprise a pipe expression that pipes the output of another UNIX command to the input of the command. Alternatively, in an embodiment, the user may execute the command with a '-n' option and include the name of the subject table to generate a report containing all records of the subject table. At block 104, in response to the first invocation of the command, a first structure of a first data table stored in a first database is automatically determined. The command will automatically read the structure of the data table in preparation of executing data manipulation language commands which may depend on knowledge of the structure of the data table. At block 106, in response to the first invocation of the command, a first plurality of rows of data out of the first data table is automatically read, where the first plurality of rows are identified based on the first input file. For each row in the first plurality of rows, the command will read the row of data in the input file and read the matching row of data from the first data table if it exists. At block 108, in response to the first invocation of the command, for each row of the first plurality of rows, the row of data read out of the first data table is automatically compared to a corresponding row of data in the first input file. At block 110, in response to the first invocation of the command, for each row of the first plurality of rows, when the row of data read out of the first data table is identical to the corresponding row of data in the first input file, the row of data in the first data table is not updated. Because this comparison is done by the command, additional data manipulation language commands may not be executed for this row of data, speeding the processing of the input file. At block 112, in response to the first invocation of the command, for each row of the first plurality of rows, when the row of data read out of the first data table is not identical to the corresponding row of data in the first input file, the row of data in the first data table is automatically updated with the data stored in the corresponding row of data in the first input file based on the first structure of the first data table. For each row of the plurality of rows, the command will compare the row of data from the data table to the matching row in the input file, and if there is a difference between the row of data from the data table and the row of data from the input file, a data manipulation language command is executed to update the data table with the data from the input file. Based on the contents of the input file, the update may be a single column or the entire row of data. The command will loop through each row of the plurality of rows until the data table has been updated to match the rows of data in the first input file. Similarly, new rows of data may be added to the data table if the rows in the input file do not exist in the data table.

In an embodiment, the method 100 further comprises altering the first data table stored in the first database from the first structure to a second structure. After the first invocation of the command has completed and after altering the data structure, the command is invoked in a second invocation, where the command invocation string identifies the first input file. In response to the second invocation of the command, the second structure of the first data table stored in the first database is automatically determined. Each time the command is invoked, the structure of the database is automatically determined, enabling the command to properly interpret the data structure even in the context of changed structure of the data table. This provides for ease of maintenance of the input files or scripts that access the data table with a changed structure. In an embodiment, these files can remain unchanged, and the command can continue to operate properly because the command identifies structure changes each time it executes. During the maintenance phase of a software component and/or application, data tables may have additional fields added, but by automatically determining the structure of the data table the command will permit the input files to continue to function properly. In response to the second invocation of the command, the first plurality of rows of data is automatically read out of the first data table, where the first plurality of rows are identified based on the first input file. In response to the second invocation of the command, for each row of the first plurality of rows, the row of data read out of the first data table is automatically compared to a corresponding row of data in the first input file. In response to the second invocation of the command, for each row of the second plurality of rows, when the row of data read out of the first data table is identical to the corresponding row of data in the first input file, the row of data in the first data table is not updated. In response to the second invocation of the command, for each row of the second plurality of rows, when the row of data read out of the first data table is not identical to the corresponding row of data in the first input file, the row of data in the first data table is automatically updated with the data stored in the corresponding row of data in the first input file based on the second structure of the first data table. Because the command determines the data structure each time it is run, the change in structure will not prevent the command from properly updating the data table with the data from the input file.

In an embodiment, the method 100 further comprises invoking the command in a third invocation after the first invocation of the command has completed, where the command identifies a second input file. In response to the third invocation of the command, the first structure of the first data table stored in the first database is automatically determined. In response to the third invocation of the command, a second plurality of rows of data is automatically read out of the first data table, where the second plurality of rows are identified based on the second input file, and where the second plurality of rows is not identical to the first plurality of rows. The second input file identifies a different plurality of rows of data which will be manipulated by the command. In response to the third invocation of the command, for each row of the second plurality of rows, the row of data read out of the first data table is automatically compared to a corresponding row of data in the second input file. In response to the third invocation of the command, for each row of the second plurality of rows, when the row of data read out of the first data table is identical to the corresponding row of data in the second input file, the row of data in the first data table is not updated. In response to the third invocation of the command, for each row of the second plurality of rows, when the row of data read out of the first data table is not identical to the corresponding row of data in the second input file, the row of data in the first data table is automatically updated with the data stored in the corresponding row of data in the second input file based on the first structure of the first data table. The command will loop through each row of the plurality of rows until the data table has been updated to match the rows of data in the second input file.

In an embodiment, the structure of the first data table is determined by reading a database schema in response to the invocation of the command. The schema of a database refers to the organization of data in a data table, articulating how the database will be constructed and divided into data tables. The schema may identify the different fields that a row of a data table has. The schema may define the data type and/or length of the different fields that a row of a data table has. In an embodiment, the command further identifies columns of the first input file that provide keys for selecting the first plurality of rows of data out of the first data table. The input file may contain data mapping input file data to rows of data in the data table.

In an embodiment, the method 100 further comprises coding the command in a Pro *C format. Pro *C is an embedded Structured Query Language programming language used by certain database management systems. The command in the Pro *C format is transformed by a precompiler, which recognizes the embedded Structured Query Language (SQL) statements in the program and replaces them with appropriate calls to the functions in the Structured Query Language runtime library. The output is standard C programming language code. A C programming language compiler is then used to compile the code and produces the binary executable, and the binary based on the compiled C program is installed in a first memory coupled to a first processor, where the first invocation of the command is performed by a first application being executed by the first processor.

In an embodiment, the binary based on the compiled programming language is installed in a second memory coupled to a second processor. The command executed on the second processor will perform the same functionality dependant upon being configured to access the same database. A command is invoked in a fourth invocation, where the command identifies a third input file. In response to the fourth invocation of the command, a third structure of a second data table stored in a second database is automatically determined. Each time the command is invoked the database schema is determined. In response to the fourth invocation of the command, a third plurality of rows of data is automatically read out of the second data table, where the third plurality of rows are identified based on the third input file. The third input file identifies a different plurality of rows of data which will be manipulated by the command. In response to the fourth invocation of the command, for each row of the third plurality of rows, the row of data read out of the second data table is automatically compared to a corresponding row of data in the third input file. In response to the fourth invocation of the command, for each row of the third plurality of rows, when the row of data read out of the second data table is identical to the corresponding row of data in the third input file, the row of data in the second data table is not updated. In response to the fourth invocation of the command, for each row of the third plurality of rows, when the row of data read out of the second data table is not identical to the corresponding row of data in the third input file, the row of data in the second data table is automatically updated with the data stored in the corresponding row of data in the third input file based on the third structure of the second data table. The command will loop through each row of the plurality of rows until the second data table has been updated to match the rows of data in the third input file.

In an embodiment, the binary is executed on a plurality of processors. The command is invoked separately on each processor, where each command invocation specifies a different input file and where each input file may identify different rows out of the same data table stored in the same database. The execution of the command instances on each processor may be run simultaneously without interfering with the command instances executed on the other processes. By running in parallel on multiple processors, the workload is distributed and can be completed more quickly. For example, a data table containing 1 million records may require 10 hours to update every record if they are processed serially. However, if the 1 million updates are distributed across 10 input files, and the command is executed in parallel on 10 different processors, each specifying a different one of the 10 input files, the updates may be completed in just one hour. Distributing the workload may provide a means to control the duration of a large database task, adding more processors to execute in parallel to reduce the time required to complete the task.

In an embodiment, the row of data is updated using a data manipulation language command executed by the command. The command allows for the user to specify a data manipulation language command as a parameter. In an embodiment, the command identifies the first data table. A table name may also be passed as a parameter to the command and will be converted by the command into data manipulation language commands for the specified table.

Figure 3:
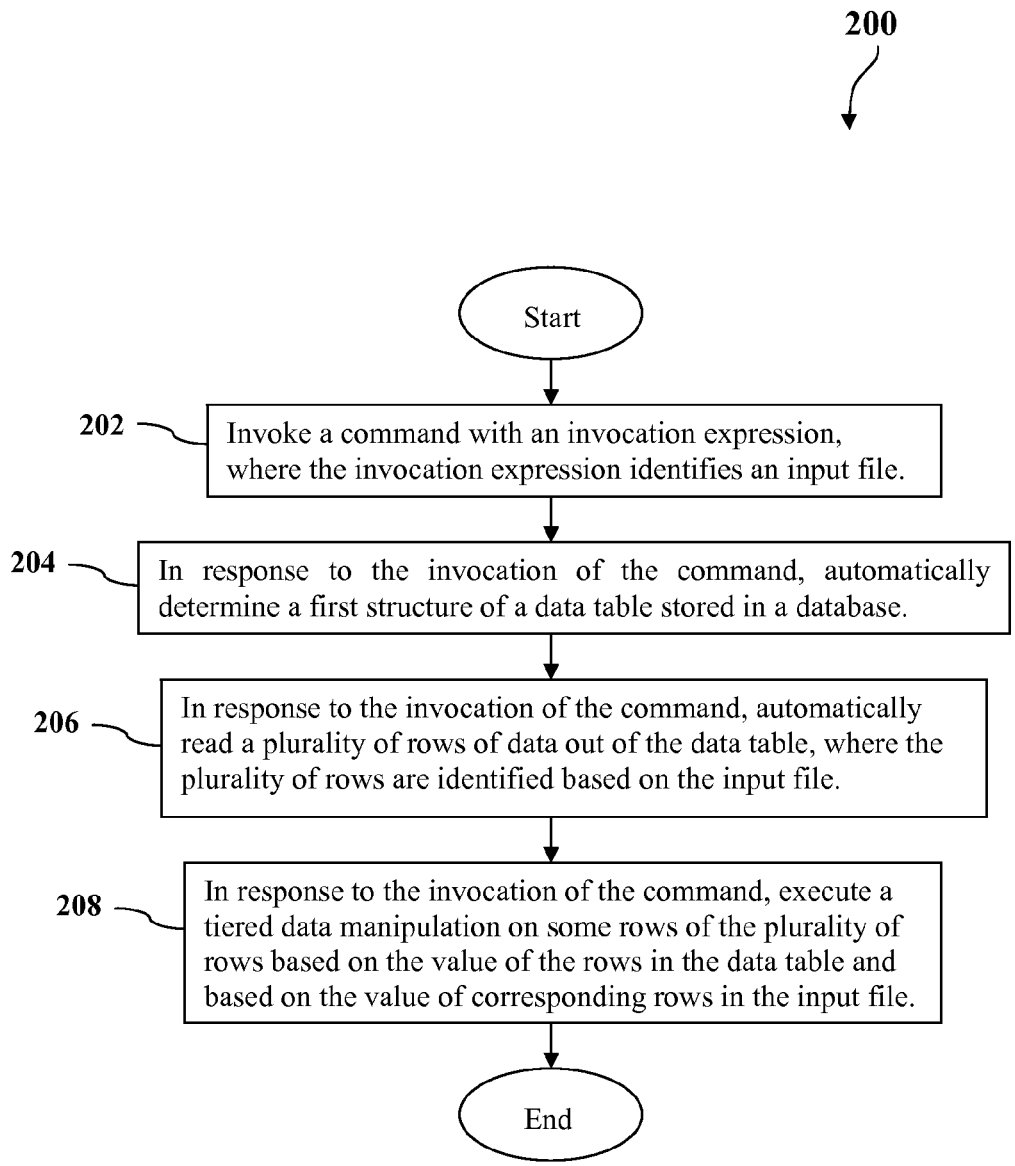
FIG. 3 is a flow chart of a method according to an embodiment of the disclosure.

Turning now to FIG. 3, a processor-implemented method 200 for performing data manipulation language commands from a command line is disclosed. At block 202, a command is invoked with an invocation expression, where the invocation expression identifies an input file. In an embodiment, the command may be invoked from a command line interface, for example from a workstation terminal. Alternatively, the command may be invoked by a function call embedded in some other computer program, computer software, or logic. An expression is composed of operators that need to be evaluated by the command. For example, adding the parameter -F /RI4: S7:75 as part of the command, where -F is the option to provide custom output, RI4:S7:75 is an expression that evaluates to mean use input file column I4, replace with select list column S7 if S7 is not null, and replace with the value 75 if S7 is null. At block 204, in response to the invocation of the command, a first structure of a data table stored in a database is automatically determined. At block 206, in response to the invocation of the command, a plurality of rows of data out of the first data table is automatically read, where the plurality of rows are identified based on the first input file. At block 208, in response to the invocation of the command, a tiered data manipulation is executed on some rows of the plurality of rows based on the value of the rows in the data table and based on the value of the corresponding rows in the input file.

In an embodiment, the tiered data manipulation executes a first data manipulation when the value of the row in the data table is different from the value of the corresponding row in the input file and executes a second data manipulation when the value of the row in the data table is the same as the value of the corresponding row in the input file. The tiered data manipulation is dependent upon the comparison between the value of the row in the data table and the value of the corresponding row in the input file. In an embodiment, the first data manipulation comprises updating the row in the data table. In an embodiment, the second data manipulation comprises leaving the row in the data table unchanged. If the value of the row in the data table is different from the value of the corresponding row in the input file, update the row in the data table, otherwise leave the row in the data table unchanged. This tiered data manipulation capability provides the ability to execute multiple data manipulation commands from a single invocation command string, promoting efficient interaction with the data store.

In an embodiment, the invocation expression comprises a UNIX pipe expression and identifies an output file to receive the piped output of the executed command. The invocation expression may also include standard UNIX command line operations which allow the user to leverage the power of UNIX command line operations in conjunction with the data manipulation capabilities of the command. For example, the user may invoke a command to retrieve a data field from the data store where the data field represents a file name stored on a document server. The command invocation string may, for example, include a UNIX pipe operator followed by the find command, which will take the file name retrieved from the data store and provide it as input to the find command in order to locate the file on the document server.

Figure 4:
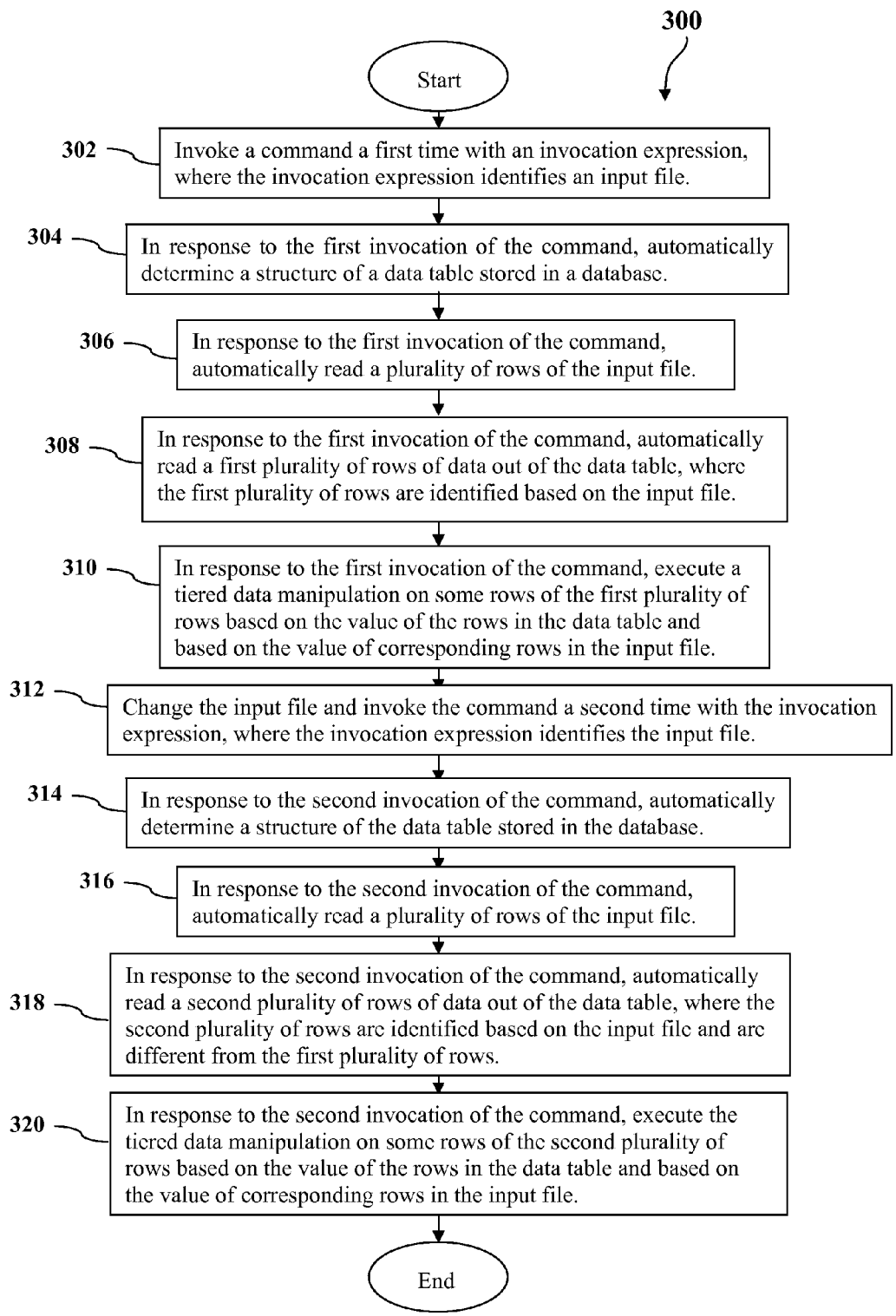
FIG. 4 is a flow chart of a method according to an embodiment of the disclosure.

Turning now to FIG. 4, a processor-implemented method 300 for performing data manipulation language commands from an operating system command line is disclosed. At block 302, a command is invoked with an invocation expression, where the invocation expression identifies an input file. At block 304, in response to the first invocation of the command, a structure of a data table stored in a database is automatically determined. At block 306, in response to the first invocation of the command, a plurality of rows of the input file is automatically read. At block 308, in response to the first invocation of the command, a first plurality of rows of data out of the data table is automatically read, where the first plurality of rows are identified based on the input file. At block 310, in response to the first invocation of the command, a tiered data manipulation is executed on some rows of the first plurality of rows based on the value of the rows in the data table and based on the value of the corresponding rows in the input file. At block 312, the input file is changed and the command is invoked a second time with an invocation expression, where the invocation expression identifies the input file. At block 314, in response to the second invocation of the command, a structure of the data table stored in the database is automatically determined. At block 316, in response to the second invocation of the command, a plurality of rows of the input file is automatically read. At block 318, in response to the second invocation of the command, a second plurality of rows of data out of the data table is automatically read, where the second plurality of rows are identified based on the input file and are different from the first plurality of rows. At block 320, in response to the second invocation of the command, a tiered data manipulation is executed on some rows of the second plurality of rows based on the value of the rows in the data table and based on the value of the corresponding rows in the input file.

In an embodiment, the method 300 further comprises where the command expression is a UNIX type expression. Utilizing UNIX command line operations will not impact the data manipulation performed by the command, but will allow additional operations to be performed with the output of the command. In an embodiment, the command expression comprises a plurality of argument parameters and argument values. The command utilizes the many supported options to perform different data manipulation functions and the arguments and values impact the behavior of the command.

In an embodiment, invoking the command is performed by a computer program, and changing the content of the input file identified by the command invocation string changes the behavior of the computer program without changing the coding of the computer program and without recompiling the computer program. The behavior of the program can be driven by the data that is given as input, and therefore no changes to the program code are necessary and the computer program does not need to be recompiled. For example, an inventory management program may update the data store based on data in the input file and calculate the inventory totals for each region. Upon executing with a new input file the program may detect an imbalance between regions causing the inventory program to automatically redirect inventory from the region with the most inventory to the region with the least inventory. The program behaved differently based upon the result of the change in the data. Because the data is based on the value of the rows in the data table identified based on the input file, changes to the input file may affect the data used by the computer program and also the behavior of the computer program.

In an embodiment, determining the structure of the data table comprises reading a schema. The schema of a database refers to the organization of data in a data table, to create a blueprint of how the database will be constructed and divided into data tables. In an embodiment, the schema is changed between the first invocation and the second invocation of the command. Because the command determines the structure of the data table by reading the schema each time the command executes, it is able to function properly even as changes are made to the schema.

Figure 5:
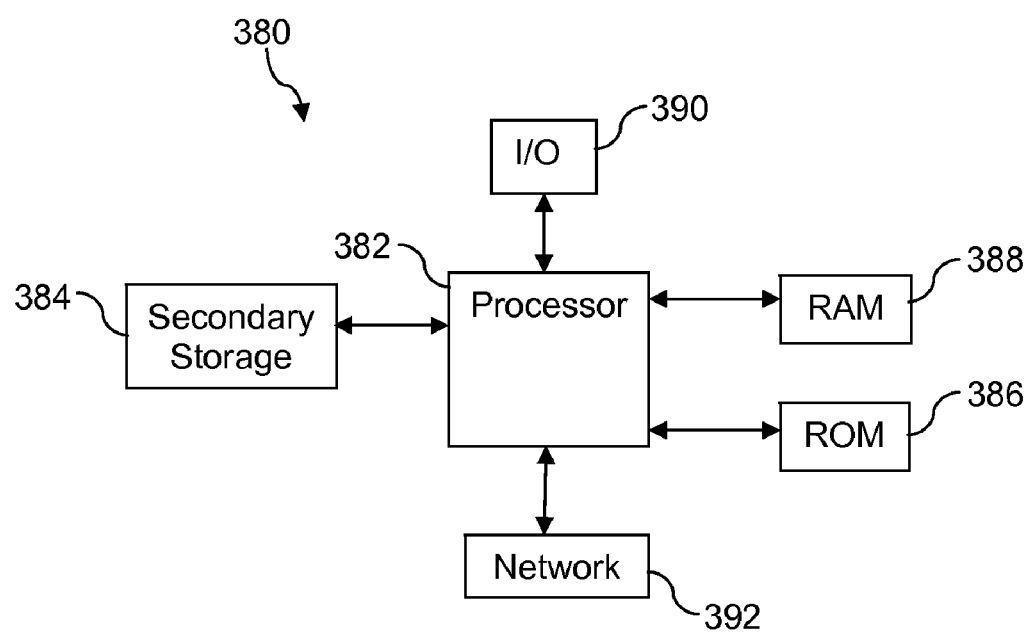
FIG. 5 illustrates an exemplary computer system suitable for implementing the several embodiments of the disclosure.

FIG. 5 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, a baseband signal and/or a signal embodied in a carrier wave may be referred to as a transitory signal. In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A processor-implemented method of performing a data store operation, comprising:

invoking from a command line interface a command to execute on a processor in a computer in a first invocation, wherein the command identifies a first input file;

in response to the first invocation of the command, automatically determining by the computer a first structure of a first data table stored in a first database;

in response to the first invocation of the command, automatically reading by the computer a first plurality of rows of data out of the first data table, wherein the first plurality of rows are identified based on the first input file;

in response to the first invocation of the command, for each row of the first plurality of rows automatically comparing by the computer the row of data read out of the first data table to a corresponding row of data in the first input file, when the row of data read out of the first data table is identical to the corresponding row of data in the first input file, not updating the row of data in the first data table, and when the row of data read out of the first data table is not identical to the corresponding row of data in the first input file, automatically updating by the computer the row of data in the first data table with the data stored in the corresponding row of data in the first input file based on the first structure of the first data table;

coding the command in a Pro *C format;

automatically transforming the command in the Pro *C format to a C programming language format;

automatically compiling the command in the C programming language format; and installing a binary based on the compiled C program in a first memory coupled to a first processor, wherein the first invocation of the command is performed by a first application being executed by the first processor.

2. The method of claim 1, further comprising:

altering the first data table stored in the first database from the first structure to a second structure;

after the first invocation of the command has completed and after altering the data structure invoking the command in a second invocation, wherein the command identifies the first input file;

in response to the second invocation of the command, automatically determining the second structure of the first data table stored in the first database;

in response to the second invocation of the command, automatically reading the first plurality of rows of data out of the first data table, wherein the first plurality of rows are identified based on the first input file;

in response to the second invocation of the command, for each row of the first plurality of rows automatically comparing the row of data read out of the first data table to a corresponding row of data in the first input file, when the row of data read out of the first data table is identical to the corresponding row of data in the first input file, not updating the row of data in the first data table, when the row of data read out of the first data table is not identical to the corresponding row of data in the first input file, automatically updating the row of data in the first data table with the data stored in the corresponding row of data in the first input file based on the second structure of the first data table.

3. The method of claim 1, further comprising:
after the first invocation of the command has completed, invoking the command in a third invocation, wherein the command identifies a second input file;
in response to the third invocation of the command, automatically determining the first structure of the first data table stored in the first database;
in response to the third invocation of the command, automatically reading a second plurality of rows of data out of the first data table, wherein the second plurality of rows are identified based on the second input file, and wherein the second plurality of rows is not identical to the first plurality of rows;
in response to the third invocation of the command, for each row of the second plurality of rows
automatically comparing the row of data read out of the first data table to a corresponding row of data in the second input file,
when the row of data read out of the first data table is identical to the corresponding row of data in the second input file, not updating the row of data in the first data table,
when the row of data read out of the first data table is not identical to the corresponding row of data in the second input file, automatically updating the row of data in the first data table with the data stored in the corresponding row of data in the second input file based on the first structure of the first data table.

4. The method of claim 1, wherein the structure of the first data table is determined by reading a database schema in response to the invocation of the command.

5. The method of claim 1, wherein the command further identifies columns of the first input file that provide keys for selecting the first plurality of rows of data out of the first data table.

6. The method of claim 1, further comprising:
installing the binary based on the compiled C programming language in a second memory coupled to a second processor;
invoking the command in a fourth invocation, wherein the command identifies a third input file;
in response to the fourth invocation of the command, automatically determining a third structure of a second data table stored in a second database;
in response to the fourth invocation of the command, automatically reading a third plurality of rows of data out of the second data table, wherein the third plurality of rows are identified based on the third input file;
in response to the fourth invocation of the command, for each row of the third plurality of rows
automatically comparing the row of data read out of the second data table to a corresponding row of data in the third input file,
when the row of data read out of the second data table is identical to the corresponding row of data in the third input file, not updating the row of data in the second data table,
when the row of data read out of the second data table is not identical to the corresponding row of data in the third input file, automatically updating the row of data in the second data table with the data stored in the corresponding row of data in the third input file based on the third structure of the second data table.

7. The method of claim 1, wherein the row of data is updated using a data manipulation language command executed by the command.

8. The method of claim 1, wherein the command identifies the first data table.

9. A processor-implemented method of performing a data store operation, comprising:
invoking a command with an invocation expression, wherein the invocation expression identifies an input file;
in response to the invocation of the command, automatically determining a first structure of a data table stored in a database;
in response to the invocation of the command, automatically reading a plurality of rows of data out of the data table, wherein the plurality of rows are identified based on the input file; and
in response to the invocation of the command, executing a tiered data manipulation on some rows of the plurality of rows based on the value of the rows in the data table and based on the value of corresponding rows in the input file, wherein the tiered data manipulation executes a first data manipulation when the value of the row in the data table is different from the value of the corresponding row in the input file and executes a second data manipulation when the value of the row in the data table is the same as the value of the corresponding row in the input file, and wherein the second data manipulation comprises leaving the row in the data table unchanged.

10. The method of claim 9, wherein the first data manipulation comprises updating the row in the data table.

11. The method of claim 9, wherein the invocation expression comprises a UNIX pipe expression and identifies an output file to receive the piped output of the executed command.

12. The method of claim 9, wherein the steps of invoking the command, determining the first structure of the data table, reading a plurality of rows of the data out of the data table, and executing a tiered data manipulation are repeated concurrently on a plurality of different computer systems, each command invocation identifying a different input file, each different input file identifying different rows of the data table, whereby the data table is updated in parallel.

13. A processor-implemented method of performing a data store operation, comprising:
invoking a command a first time with an invocation expression, wherein the invocation expression identifies an input file, wherein the command comprises an expression, wherein the command expression is a UNIX type expression and comprises a plurality of argument parameters and argument values, and wherein invoking the command is performed by a computer program;
in response to the first invocation of the command, automatically determining a structure of a data table stored in a database;
in response to the first invocation of the command, automatically reading a plurality of rows of the input file;
in response to the first invocation of the command, automatically reading a first plurality of rows of data out of the data table, wherein the first plurality of rows are identified based on the input file;
in response to the first invocation of the command, executing a tiered data manipulation on some rows of the first plurality of rows based on the value of the rows in the data table and based on the value of corresponding rows in the input file;
changing the input file, wherein changing the input file changes the behavior of the computer program without changing the coding of the computer program and without recompiling the computer program;

invoking the command a second time with the invocation expression, wherein the invocation expression identifies the input file;

in response to the second invocation of the command, automatically determining the structure of the data table stored in the database;

in response to the second invocation of the command, automatically reading a plurality of rows of the input file;

in response to the second invocation of the command, automatically reading a second plurality of rows of data out of the data table, wherein the second plurality of rows are identified based on the input file and wherein the second plurality of rows are different from the first plurality of rows; and in response to the second invocation of the command, executing the tiered data manipulation on some rows of the second plurality of rows based on the value of the rows in the data table and based on the value of corresponding rows in the input file.

14. The method of claim 13, wherein determining the structure of the data table comprises reading a schema.

15. The method of claim 14, wherein the schema is changed between the first invocation of the command and the second invocation of the command.

* * * * *